United States Patent
Vutukuri et al.

(10) Patent No.: US 10,341,818 B2
(45) Date of Patent: Jul. 2, 2019

(54) INITIAL ACCESS OF WIRELESS ACCESS NETWORK USING ASSISTANCE INFORMATION

(71) Applicant: BlackBerry Limited, Waterloo (CA)

(72) Inventors: Eswar Vutukuri, Havant (GB); Stephen John Barrett, Haywards Heath (GB); Adrian Buckley, Tracy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 1 day.

(21) Appl. No.: 15/372,365

(22) Filed: Dec. 7, 2016

(65) Prior Publication Data
US 2018/0160271 A1 Jun. 7, 2018

(51) Int. Cl.
*H04W 4/02* (2018.01)
*H04W 24/10* (2009.01)
(Continued)

(52) U.S. Cl.
CPC ........ *H04W 4/029* (2018.02); *G06F 16/2379* (2019.01); *H04B 17/318* (2015.01); *H04W 8/22* (2013.01); *H04W 12/06* (2013.01); *H04W 24/10* (2013.01); *H04W 48/14* (2013.01); *H04W 48/16* (2013.01); *H04W 48/18* (2013.01);
(Continued)

(58) Field of Classification Search
CPC ....... H04W 4/02; H04W 12/08; H04W 64/00; H04W 48/18; H04W 48/04; H04W 4/023; H04W 8/22; H04W 48/16; H04W 60/00; H04W 64/003; H04W 88/06; H04W 4/025; H04W 4/027; H04W 28/0231; H04W 72/00; H04W 36/0083; H04W 28/0289; H04W 72/04; H04W 36/06; H04W 36/0061; H04W 36/08; H04W 36/18; H04W 76/10; H04W 72/02; H04W 48/20; H04W 88/08; H04W 84/12; H04W 24/02;
(Continued)

(56) References Cited

U.S. PATENT DOCUMENTS 5,613,208 A * 3/1997 Blackman ......... H04W 52/0235
455/434
8,731,605 B1 * 5/2014 Shetty ................... H04W 48/18
455/435.2
(Continued)

FOREIGN PATENT DOCUMENTS

EP 2088807 A2 8/2009

OTHER PUBLICATIONS

U.S. Appl. No. 15/372,367 entitled Sending Reports of Asset Transport Status filed Dec. 7, 2016 (50 pages).
(Continued)

*Primary Examiner* — Olumide Ajibade Akonai
(74) *Attorney, Agent, or Firm* — Trop, Pruner & Hu, P.C.

(57) ABSTRACT

In some examples, a device sends first information to a service, the first information comprising location information of the wireless device, and receives, from the service, assistance information that is based on the first information. The device performs initial access of a wireless access network using the assistance information to achieve power saving at the wireless device, and transmits second information to the service over the wireless access network node.

22 Claims, 5 Drawing Sheets

(51) Int. Cl.
*H04W 48/08* (2009.01)
*H04W 48/14* (2009.01)
*H04W 48/16* (2009.01)
*H04W 48/18* (2009.01)
*H04W 72/04* (2009.01)
*H04W 88/06* (2009.01)
*H04B 17/318* (2015.01)
*H04W 4/029* (2018.01)
*H04W 8/22* (2009.01)
*H04W 12/06* (2009.01)
*H04W 52/02* (2009.01)
*G06F 16/23* (2019.01)
*H04L 29/08* (2006.01)

(52) U.S. Cl.
CPC .... *H04W 52/0209* (2013.01); *H04W 72/0453* (2013.01); *H04L 67/303* (2013.01); *H04W 4/02* (2013.01); *H04W 48/08* (2013.01); *H04W 88/06* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/162* (2018.01); *Y02D 70/164* (2018.01); *Y02D 70/21* (2018.01); *Y02D 70/26* (2018.01)

(58) Field of Classification Search
CPC ..... H04W 88/02; H04W 8/005; H04W 48/14; H04L 67/18; H04L 63/10
See application file for complete search history.

(56) References Cited

U.S. PATENT DOCUMENTS

| | | | |
|---|---|---|---|
| 9,451,513 B2 | 9/2016 | Hole | |
| 9,716,643 B2 * | 7/2017 | Chan | H04L 43/103 |
| 2004/0121774 A1 * | 6/2004 | Rajkotia | H04W 36/32 |
| | | | 455/441 |
| 2010/0178928 A1 * | 7/2010 | O'Reilly | H04W 28/26 |
| | | | 455/452.2 |
| 2011/0312333 A1 * | 12/2011 | I'Anson | H04W 8/245 |
| | | | 455/456.1 |
| 2013/0100819 A1 | 4/2013 | Anchan | |
| 2014/0274035 A1 * | 9/2014 | Unger | H04W 48/18 |
| | | | 455/432.1 |
| 2015/0085650 A1 * | 3/2015 | Cui | H04W 92/02 |
| | | | 370/230 |
| 2015/0173008 A1 | 6/2015 | Siddam | |
| 2015/0192679 A1 * | 7/2015 | Stinson | G01S 19/14 |
| | | | 342/357.51 |
| 2015/0256993 A1 * | 9/2015 | Bellamkonda | H04W 8/12 |
| | | | 455/433 |
| 2016/0080194 A1 * | 3/2016 | Tsutsui | H04W 16/14 |
| | | | 370/216 |
| 2016/0278038 A1 * | 9/2016 | Larsson | H04W 60/04 |
| 2017/0006512 A1 | 1/2017 | Hole | |

OTHER PUBLICATIONS

3GPP TS 36.304 V14.4.0,Technical Specification, 3rd Generation Partnership Project; Technical Specification Group Radio Access Network; Evolved Universal Terrestrial Radio Access (E-UTRA); User Equipment (UE) procedures in idle mode (Release 14) (Sep. 2017) (49 pages).

GSM Association, Non-confidential Official Document SGP.02—Remote Provisioning Architecture for Embedded UICC Technical Specification, Remote Provisioning Architecture for Embedded UICC Technical Specification, Version 3.2, Jun. 27, 2017 (309 pages).

European Patent Office, International Search Report and Written Opinion for PCT/EP2017/081592 dated Feb. 8, 2018 (12 pages).

* cited by examiner

INITIAL ACCESS OF WIRELESS ACCESS NETWORK USING ASSISTANCE INFORMATION

BACKGROUND

Trucks, tractor-trailers, or tractors that are connected to chassis for carrying containers can be used to transport cargo that includes goods. Cargo can be transported from an origin (such as a factory, a warehouse, a retail outlet, etc.) to a destination (such as retail outlet, a warehouse, customer premises, etc.) along a route.

BRIEF DESCRIPTION OF THE DRAWINGS

Some implementations of the present disclosure are described with respect to the following figures.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A moveable platform can be used to carry physical items (also referred to as "assets") between different geographic locations. For example, the moveable platform can be a container (that is attached to a tractor), a truck, or a trailer, where the container provides an enclosed space in which the physical items can be stored during shipment. In other examples, the moveable platform can include another type of carrier structure that is able to carry physical items. More generally, the moveable platform can be part of, mounted on, or attached, as applicable, to a vehicle, such as a truck, a trailer, a tractor, a car, a train, a ship, an airplane, and so forth. In further examples, a moveable platform can include any entity that is able to move, such as a human, an animal, a cart, a box, and so forth, where such entity is able to carry one or more physical items, such as clothing, a bag, a tag, a collar, and so forth.

An entity such as a shipper, a distributor, a manufacturer, a seller of goods, or any other entity may wish to track assets (such as cargo) that are being transported using moveable platforms. To do so, an asset tracking device can be mounted on a moveable platform. An asset tracking device refers to an electronic device that is able to perform tracking of a transport status as well as other information relating to an asset that is carried by a moveable platform. The asset tracking device can include a sensor or multiple sensors to acquire certain sensor information. The transport status can include a current location of an asset that is being tracked by the asset tracking device, an estimated (expected) time of arrival of the asset that is tracked by the asset tracking device, or any other information that relates to the transport of the asset. In some examples, the asset tracking device can be part of or implemented with a mobile equipment, a mobile station, a user equipment, a Wi-Fi station, or any other type of mobile device.

A current location can include a global positioning system (GPS) location, a location derived based on triangulation of signals from base stations or other wireless access network nodes, or a location based on other types of signals. The current location changes as the asset is moved by a moveable platform.

An estimated time of arrival of an asset refers to a time that the asset is expected to arrive at a specified destination. During transport, the estimated time of arrival can change (increase or decrease), such as due to unexpected delays, faster than expected travel times of a moveable platform, or other factors.

Examples of other information that relates to the transport of an asset and that can be communicated by an asset tracking device includes any or some combination of the following: a load status of a moveable platform (e.g., whether or not a moveable platform is loaded with asset(s) or an amount of loading of the moveable platform, e.g., 25% loaded, 50% loaded, etc., and/or 1000 Kg, 1500 Kg, etc.), conditions of the environment around the asset(s) (e.g., a measured temperature, a measured humidity, etc.), or other information that can be acquired by sensor(s).

Each of multiple asset tracking devices on various moveable platforms can communicate a transport status and other sensor information over a network to a remote service to allow the remote service to track assets that are being moved by the moveable platforms. Such a remote service can also be referred to as an "asset tracking service." The remote service can include a server or a collection of servers and associated network equipment that may be located at a fixed location or in a mobile device or as part of a data center or cloud. Alternatively, the remote service can include program code executed in a system, such as a cloud system or other type of system, which includes a computer or a distributed arrangement of computers. Asset tracking can involve tracking of any or some combination of the following: current locations of the assets, estimated times of arrival of assets, cargo load status of moveable platforms, conditions of the environment around the assets (where such conditions can include a measured temperature, a measured humidity, measured wind speed, measured current speed etc.), and/or other information.

An asset tracking device can include a communication component to communicate over a network. In some examples, asset tracking devices mounted on moveable platforms can be part of a larger network of devices. This larger network of devices can be part of the "Internet-of-Things" (IoT) technology paradigm to allow different types of devices to communicate different types of data (including sensor data, voice data, video data, e-mail data, picture or image data, messaging data, web browsing data, and so forth). In addition to network traffic communicated by computers, smartphones, wearable devices, and the like, the IoT technology paradigm contemplates that other types of devices, including household appliances, vehicles, sensor devices, thermostats, and so forth, have connectivity to a network to allow the devices to communicate respective data.

More generally, asset tracking using network connected asset tracking devices can involve acquiring transport status information and/or sensor information, transmitting the transport status information and/or sensor information, and aggregating such transport status information and/or sensor information or producing other measures based on the transport status information and/or sensor information to determine information associated with the assets that are being transported by moveable platforms. Based on data received from the asset tracking devices, a service can update a database, run analytics, and/or present status information for display, such that further decisions or actions can be performed. The asset tracking can be used to improve fleet utilization, reduce operating cost, reduce loss of assets due to theft, and so forth.

An asset tracking device may be run using a battery that may have to last a relatively long period of time (e.g., many years) without recharge. As a result, it is desirable to reduce power consumption of the asset tracking device to the extent possible. In examples where the communication component of the asset tracking device is a cellular modem or other type of wireless transceiver, a significant amount of time can be spent in the initial access of a cellular access network or other type of wireless access network to gain a wireless communication service to allow the asset tracking device to send a report to a remote service.

An example cellular access network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular access networks can be employed, such as second generation (2G) or third generation (3G) cellular access networks, such as a Global System for Mobile (GSM) cellular access network, an Enhanced Data rates for GSM Evolution (EDGE) cellular access network, a Universal Terrestrial Radio Access Network (UTRAN), a Code Division Multiple Access (CDMA) 2000 cellular access network, and so forth. In further examples, cellular access networks can be fifth generation (5G) or beyond cellular access networks. In additional examples, a wireless access network can include a wireless local area network (WLAN), which can operate according to the Institute of Electrical and Electronic Engineers (IEEE) 802.11 or Wi-Fi Alliance Specifications. In other examples, other types of wireless access networks can be employed by asset tracking devices to communicate with a remote service, such as a Bluetooth link, a Zigbee network, and so forth. Additionally, some wireless access networks can enable cellular IoT, such as wireless access networks according to LTE Advanced for Machine-Type Communication (LTE-MTC), narrowband IoT (NB-IoT), and so forth.

Although specific examples of wireless access networks are listed above, it is noted that other types wireless access networks that operate according to other protocols can be employed in other examples.

In a cellular access network, the asset tracking device can perform various operations to establish a connection with a cellular access network such that the asset tracking device can perform communications of application data (including transport status information and/or other sensor information) over the cellular access network to a remote endpoint system. For example, the asset tracking device can perform a Received Signal Strength Indicator (RSSI) scan to measure a received signal strength in a frequency band of interest. The asset tracking device can then identify specific channels of interest in which a received signal strength is above a predetermined threshold, and select those channels for further processing. In each selected channel, the asset tracking device decodes synchronization signals to perform synchronization with identified cells of the cellular access network. The asset tracking device also reads certain system information, and decodes such system information for each identified cell. The asset tracking device can then perform cell and service provider, e.g., public land mobile network (PLMN), selection to identify the best cell belonging to a preferred service provider e.g., PLMN and camps on the cell. Upon selecting a suitable cell, the asset tracking device performs a random access procedure and performs a procedure with the network e.g., an attach procedure. Subsequent to attaching to the network, the asset tracking device can transmit and receive application data, such as transport status and/or sensor information.

The foregoing sequence of tasks to establish a connection between the asset tracking device and a cellular access network is both time consuming and can consume a large amount of power, particularly if performed multiple times to send multiple reports.

Establishing connections with other types of wireless networks can similarly be time consuming and can consume a relatively large amount of power at the asset tracking device.

In some examples, when performing asset tracking, an asset tracking device can send reports to a remote service over a network at predetermined times. Such predetermined times can be periodic times, where the asset tracking device sends a report after each periodic time interval. In other examples, the asset tracking device can send reports at other scheduled times. A "report" can refer to any collection of information (sent in one or more messages or one or more data units).

The periodicity of reports transmitted by the asset tracking device to the remote service can be based on whether or not the moveable platform on which the asset tracking device is mounted is moving, and the periodicity of the reports can be configurable. For example, the asset tracking device can send reports as frequently as every 15 minutes when the moveable platform is in motion. In other examples, such as when the moveable platform is not in motion or is moving slowly, the asset tracking device can send reports at longer time intervals.

The asset tracking device can keep its wireless transceiver (e.g., cellular modem or other type of wireless transceiver) off between the predetermined times at which reports are sent, or alternatively, the asset tracking device can maintain the wireless transceiver on (but in a lower power mode) between sending reports. In either case, there can be substantial power consumption at the asset tracking device, which can deplete the battery of the asset tracking device in implementations where the asset tracking device is battery-powered. When the wireless transceiver is turned off between sending of reports, the asset tracking device has to go through a connection procedure to connect to a wireless access network before a report can be sent. On the other hand, when the wireless transceiver is maintained in the on state between sending of reports, the wireless transceiver consumes power even though the wireless transceiver may be in a lower power mode.

If a public land mobile network (PLMN) (or more generally, a service provider), radio access technology (RAT), frequency band, and carrier frequency which was available when the last asset tracking report was transmitted is also available at the next (second) time instance when the next asset tracking report is to be sent, then the asset tracking device may be able to gain access to the wireless access network quickly, by using any of the PLMN, RAT, frequency band, and carrier frequency that was last used. A PLMN can refer to a network that is established and operated by a network operator to provide mobile services to subscribers and other users. A RAT refers to the specific technology used by a wireless access network, such as NB-IOT, LTE, LTE-MTC, GSM, EDGE, UTRA, CDMA 2000, 5G, IEEE 802.11, Bluetooth, Zigbee, and so forth. A frequency band refers to a band of frequencies that are useable to perform communications with a wireless access network. A carrier frequency refers to a frequency of a carrier that is used to communicate information between a wireless device and a wireless access network node.

On the other hand, when the previously used PLMN, RAT, frequency band, and carrier frequency are not available at the time that the next asset tracking report is to be sent, then the asset tracking device may have to perform a longer or more detailed scan to identify a PLMN, RAT, frequency band, and carrier frequency to use, which can take a relatively long period of time and can consume significant power.

In accordance with some implementations of the present disclosure, solutions are provided to reduce power consumption for initial access by an asset tracking device. In some examples, this can be achieved without imposing significant additional memory requirements on the asset tracking device (which allows the overall cost of the asset tracking device to be kept low), and also reducing or minimizing support system overhead (i.e., reducing or minimizing active communications or interactions between an asset tracking service and one or more network operators).

Figure 1:
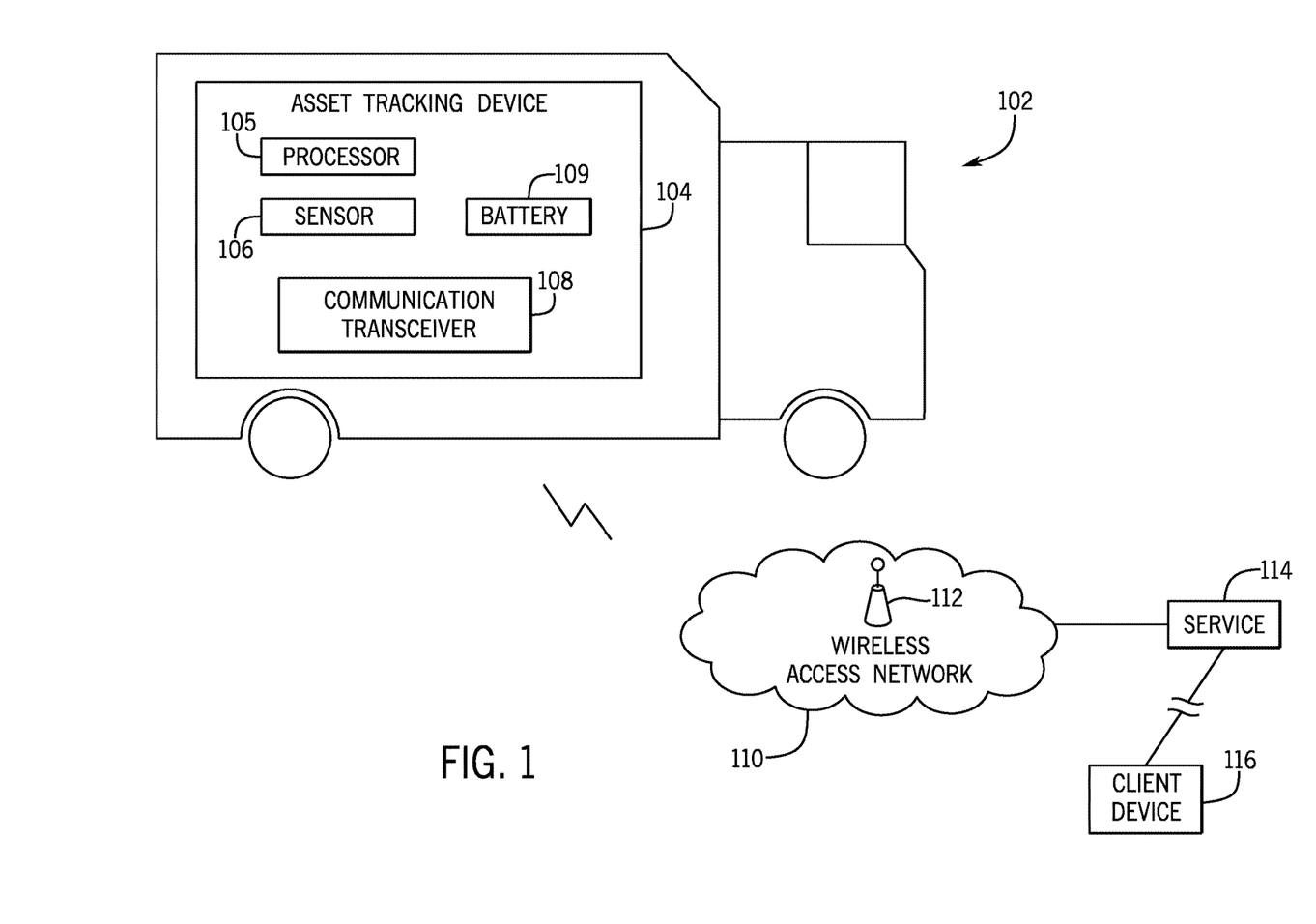
FIG. 1 is a block diagram of an example arrangement that includes an asset tracking device and a remote service, according to some implementations.

FIG. 1 is a block diagram of an example arrangement that includes a moveable platform 102 on which an asset tracking device 104 is mounted. Although not shown, the moveable platform 102 also carries an asset (or multiple assets). The asset tracking device 104 includes a sensor 106 and a communication transceiver 108 (such as a cellular modem or other type of wireless transceiver). The communication transceiver 108 includes a transmitter (to transmit data) and a receiver (to receive data). Although just one sensor 106 is shown, it is noted that the asset tracking device 104 can include multiple sensors, for acquiring respective different information. In some examples, the sensor 106 can include a GPS receiver to acquire a GPS location of the asset tracking device 104. In other examples, the sensor 106 can derive a position of the asset tracking device 104 based on triangulation of signals received from wireless access network nodes (e.g., base stations of a cellular access network or access points of a WLAN or other wireless access network nodes).

The sensor(s) 106 can also acquire other information, such as environmental information (e.g., temperature, humidity, etc.), information of a speed of the moveable platform 102, a load status of the moveable platform, and so forth.

FIG. 1 also shows a wireless access network 110, which can be a cellular access network, a WLAN, or another type of wireless access network. The wireless access network 110 includes a wireless access network node 112, which can be a cellular base station or other type of wireless access network node, such as an access point (AP) of a WLAN that operates according to the IEEE 802.11 standards, or another access node that operates according to another protocol. The wireless access network 110 can include multiple wireless access network nodes 112.

As the moveable platform 102 moves between different locations, the asset tracking device 104 is able to communicate with different wireless access network nodes or with different wireless access networks.

The wireless access network 110 is coupled to a service 114 (an asset tracking service) that is to receive and process asset tracking information transmitted by the asset tracking device 104. The service 114 can include one or more physical servers, or can include program code executed on one or multiple computers. More generally, the service 114 can be part of or can include a network node. A "network node" can refer to any entity (a hardware structure or machine-readable instructions) that can communicate over a network.

The asset tracking device 104 includes a processor 105, which can include any or some combination of the following: a microprocessor, a core of a multi-core microprocessor, a microcontroller, a programmable gate array, a programmable integrated circuit device, or any other hardware processing circuit.

The asset tracking device 104 also includes a battery 109 to provide power to various electronic components of the asset tracking device 104, such as the processor 105, the sensor 106, the communication transceiver 108, and so forth.

As further shown in FIG. 1, a client device 116 can communicatively couple to the service 114, to access information stored by the service 114. The client device 116 can include any of the following: a desktop computer, a notebook computer, a tablet computer, a smart phone, a wearable device (e.g., a smart watch, smart eyeglasses, a head-mounted device, etc.), and so forth. A user can use the client device 116 to access status tracking information (reported by asset tracking devices) from the service 114, access results (e.g., reports, notifications, etc.) based on status tracking information reported by asset tracking devices, and so forth.

Communicating Asset Tracking Reports

Figure 2:
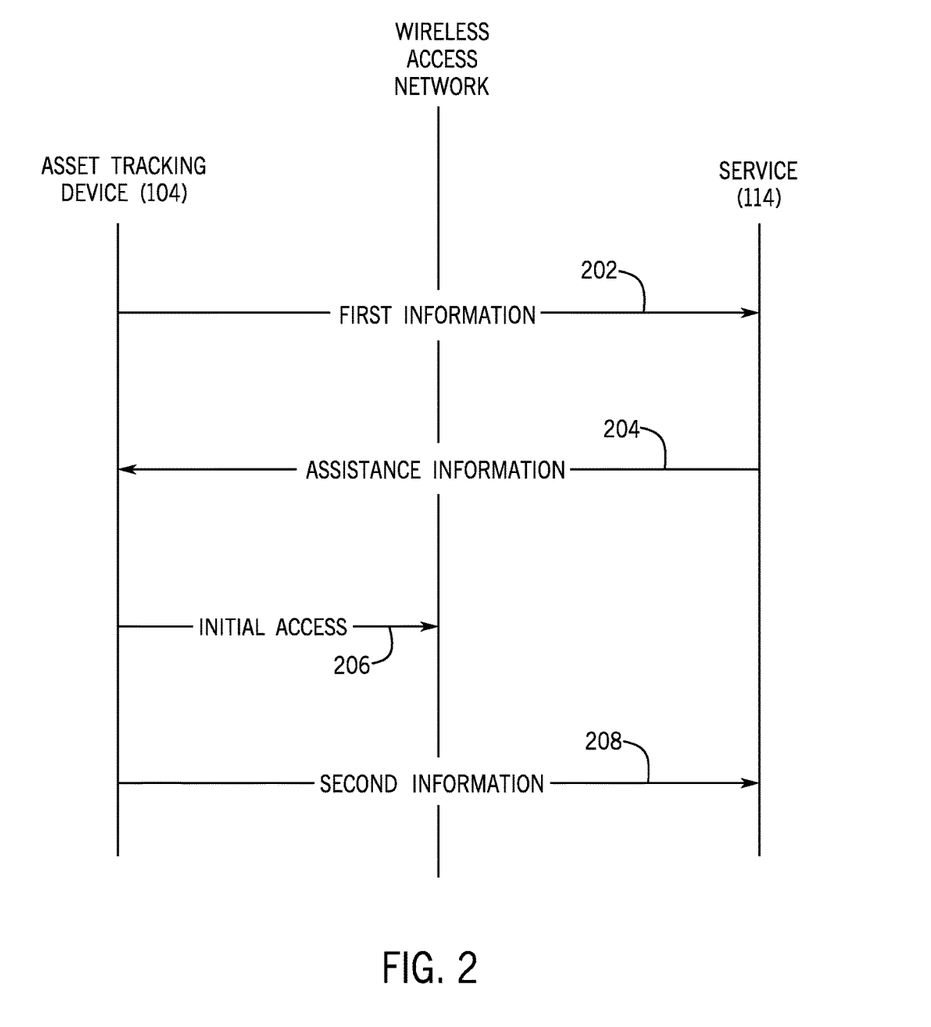
FIG. 2 is a message flow diagram depicting operations involving an asset tracking device, a wireless access network, and an asset tracking service, according to some implementations.

FIG. 2 is a message flow diagram illustrating operations involving the asset tracking device 104, a wireless access network (e.g., 110 or a different wireless access network), and the service 114 according to some examples. The asset tracking device 104 sends (at 202) first information to the service 114. Note that the first information may be sent over the wireless access network. The first information can be sent in an asset tracking report, including a message, multiple messages, an information element in a message, or multiple information elements in one or more messages. The first information can include location information of the asset tracking device 104, and possibly also other information, where the other information can be referred to as Additional Device Reported Information (ADRI).

Examples of location information can include any or some combination of the following: a cell identifier (which identifies a cell of a wireless access network), a tracking area code (which identifies a tracking area that includes one or more cells of a wireless access network), a location area code (which identifies a location area that includes wireless access network nodes that have been grouped), a routing area code (which identifies a routing area that includes wireless access network nodes that have been grouped), GPS coordinates, an identity of a service provider (whose location is known to a sufficient degree of accuracy), a street address, a waypoint or landmark, an address of a network node (e.g., an identifier of a network node whose location is known), and so forth. More generally, the location information can identify or provide some indication of a location of the asset tracking device 104. The first information can include information identifying one location (or multiple locations) of the asset tracking device 104. A "cell" as used herein can refer to a cell of a cellular access network, an access point of a WLAN, a cell associated with a relay device (e.g., a ProSe relay, a Bluetooth connection), or any other area that is associated with communication equipment to allow communications.

Examples of the ADRI can include any or some combination of the following information. It is noted that in some examples, each of at least some of the following information only has to be sent once and on any subsequent change.

- Service provider information, which can include any or some combination of a domain name, a service set identifier (SSID), a PLMN code such as a mobile country code (MCC) and a mobile network code (MNC), a country code (e.g., MCC), an International Organization for Standardization (ISO) code, etc. In some examples, multiple pieces of service provider information can be provided, such as an SSID and a PLMN code. A domain name and an SSID can identify a service provider of an access network, in some examples. The combination of an MCC and an MNC can identify a PLMN.
- Wireless radio information, such as any or some combination of the following for each wireless access network node: a frequency band and/or carrier frequency(ies) of a RAT of a PLMN, measured signal strengths of various wireless access network nodes, an identifier of a wireless access network node, a full list or partial list of neighboring wireless access network nodes, and so forth, which can optionally be provided for multiple wireless access network nodes that the asset tracking device 104 may have scanned.
- Information relating to a currently used PLMN (identified by an MCC and MNC), a currently used RAT, a currently used frequency band, and a currently used carrier frequency.
- A measurement report that includes measured signal strengths of neighbor wireless access network nodes, such as a measurement report according to LTE or other standards.
- Selected system information of wireless access network nodes that are within the range of or that have been scanned by the asset tracking device 104. The wireless access network system information can include information in system information blocks broadcast by a wireless access network, for example, such as in a corresponding geographic location, where the system information that is broadcast can include an MIB, an SIB, or any other type of system information. The system information can also include information related to synchronization channels of specific cells of a wireless access network, such as Primary Synchronization Signal (PSS) and/or Secondary Synchronization Signal (SSS) sequences in examples where an LTE access network is in use, or scrambling sequences used, and so forth
- Route information, which can include any or some combination of the following: a current direction of travel of the moveable platform 102, a past direction of travel of the moveable platform 102, a planned route of the moveable platform 102, a current speed of the moveable platform 102, and a previous speed (including a corresponding time stamp) of a moveable platform (or multiple previous speeds along with multiple respective time stamps).
- Device profile information, which relates to a profile that includes a combination of a file structure, data and application available on the asset tracking device, such as in an embedded Universal Integrated Circuit Card (eUICC), which allows, when enabled, the access to a specific wireless network infrastructure. The device profile information can include a profile identity of the profile currently being used by the asset tracking device 104, where the profile identity that identifies a profile can be any or some combination of the following: a public user identity that is unique to the profile, a private user identity that is unique to the profile, a UICC Application identifier, and so forth. In further examples, the device profile information can also include a list of multiple profile identities that identify profiles supported by the asset tracking device 104. A public user identity can include any or some combination of the following: a Mobile Station International Subscriber Director Number (MSISDN) that uniquely identifies a subscription in a wireless access network, an email address, a Session Initiation Protocol (SIP) uniform resource identifier (URI), a telephone URI, a network access identifier (NAI), or any other identity relating to a user that is known to the public. A private user identity can include any or some combination of the following: International Mobile Subscriber Identity (IMSI), a SIP URI, an NAI, or any other identity that is only known to the network and the device.
- Information regarding capabilities of the asset tracking device 104. Device capabilities can include radio or network access capabilities of the asset tracking device 104, such as a capability to access certain RAT(s), frequency bands, carriers, etc., or a capability to perform certain access related functions that may be relevant to an initial access of a wireless access network, such as the ability to perform fast scan over an entire frequency band to look for RF channels with higher RSSI.
- Wireless access network node location information, which includes known or estimated locations of wireless access network nodes in the vicinity of the asset tracking device 104. For example, the location of a wireless access network node may have been determined by a wireless device using an observed time difference of arrival (OTDOA) based on radio signals from wireless access network nodes.

In response to receipt of the first information, the service 114 sends (at 204) assistance information, which is received by the asset tracking device 104. The assistance information is based on the first information. In some examples, the assistance information that is sent by the service 114 back to the asset tracking device 104 can be included as part of an acknowledgement (ACK) message that is sent from the service 114 to the asset tracking device 104 in response to receiving an asset tracking report (that includes the first information) from the asset tracking device 104.

The assistance information can be referred to as Server Assistance Information (SAD. Generally, the assistance information includes information that is useable by the asset tracking device 104 to more quickly or more efficiently gain access to the wireless access network as compared to a procedure to gain access to a wireless access network in the absence of the assistance information.

The assistance information is provided for the predicted, expected location at which the next asset tracking report is to be sent (at a future time) by the asset tracking device 104. This expected location can be determined by the service 114 using any one or some combination of the following factors: a current location of the asset tracking device 104, a current speed of the asset tracking device 104, historic speed(s) of the asset tracking device 104, an estimated speed of the asset tracking device 104, a direction of travel of the asset tracking device 104, a time instance when the next asset tracking report is to be triggered (where this time instance can be a scheduled time instance), and planned route information that may be known to the asset tracking device 104 or the service 114, such as from a navigation system, logistics systems, and so forth.

In further examples, the assistance information can be constructed that takes into account the following one or more additional factors:

Profiles supported by the asset tracking device 104, which impacts which service providers the asset tracking device 104 can access. For example, the service 114 will not provide (or will set at a lower priority) a RAT, frequency band, and/or carrier frequency for which there is no service provider that the asset tracking device 104 can access or for which the cost of access is too high.

Capabilities supported by the asset tracking device 104. For example, if the service 114 is aware that the asset tracking device 104 can more efficiently search all bands of a given RAT as opposed to changing between different RAT/band combinations, then the service 114 can order RATs, frequency bands, carrier frequencies in a list of RATs/frequency bands/carrier frequencies according to the capabilities supported by the asset tracking device 104.

The currently used service provider (e.g., PLMN), RAT, frequency band, and/or carrier frequency, of the asset tracking device 104. For example, it may be quickest for the asset tracking device 104 to access the last used service provider/RAT/frequency band/carrier frequency, and hence it may be useful for the service 114 to know the currently used service provider/RAT/frequency band/carrier frequency so that the service 114 can determine whether it is likely to be available at the next time instance at which an asset tracking report is to be sent, and if so, the service 114 can tailor the assistance information accordingly. In the ensuing discussion, "service provider/RAT/frequency band/carrier frequency" can refer to information that includes any one or more of a service provider, a RAT, a frequency band, or a carrier frequency.

The assistance information sent by the service 114 to the asset tracking device 104 can include any one or some combination of the following:

Prioritized, ordered list of RATs/frequency bands/carrier frequencies to scan when sending the next report. For example, the list can include RATs, frequency bands, and/or carrier frequencies arranged in sorted order according to respective priorities. In some examples, the RATs/frequency bands/carrier frequencies can be indexed by one or more parameters (e.g., cell identifier, tracking area code, location area code, routing area code, GPS coordinates, service provider identity, street address, waypoint or landmark, network node address, etc.) in the location information. In some examples, the RATs/frequency bands/carrier frequencies can be prioritized either using an explicit indication (e.g., each of the foregoing can be associated with an explicit indication of relatively ranking, such as "1," "2," "3" in the example list depicted in Table 1 below) or implicitly by the list being in a prioritized order. In further examples, the list may direct the asset tracking device 104 to include, or indeed only consider, the currently used RAT/frequency band/carrier frequency (or service provider, such as a PLMN), which can be achieved with a low overhead binary field indicating whether or not to continue using the current RAT/frequency band/carrier frequency (or service provider, such as a PLMN). An example ordered list of RATs/frequency bands/carrier frequencies is provided in Table 1 below:

TABLE 1

| Priority | RAT | Frequency band | Carrier frequency | Service provider |
|---|---|---|---|---|
| 1 | LTE | X | Y | Company A |
| 2 | LTE | X | Y | Company B |
| 3 | UMTS | P | Q | Company A |
| ... | | | | |

Prioritized, ordered list of service providers (e.g., PLMNs). The service 114 can use such a list to direct the asset tracking device 104 to select a most preferred service provider in the event that multiple service providers are available on a given RAT/frequency band/carrier frequency. If this information is sent, it may be indicated explicitly or implicitly that this list should take priority over any list that is available in the profiles that are available on the asset tracking device 104. In the prioritized list of service providers, respective combinations of MCCs and MNCs can identify respective PLMNs, for example.

System information pertaining to wireless access network nodes, which may be indexed by one or more parameters in the location information in some examples. The system information can include information carried in system information blocks of the wireless access network nodes that are expected to be seen by the asset tracking device 104 at its location.

Prioritized list of profile identity(ies). This list informs the asset tracking device 104 of which profile is to be preferentially selected in the event that the asset tracking device 104 has profiles for multiple service providers. Since a profile can include preferred lists of service providers (e.g., PLMNs), this can impact service provider (e.g., PLMN) selection. This prioritized list of profile identity(ies) may be useful in the event that a given service provider (e.g., PLMN) that is accessible on a given RAT/frequency band/carrier frequency is available on multiple profiles and in such a case it may be preferred to select a profile which will result in a lower cost to a user (e.g., a profile for which the asset tracking device 104 would not be considered to be roaming). An alternative is that the asset tracking device 104 is preconfigured with enough information itself to make a selection of which profile is most preferred (e.g., which will result in lowest cost given the service providers (e.g., PLMNs) that are accessible on the given RAT/frequency band/carrier frequency).

User credentials that may be useful when sending a subsequent asset tracking report. A credential can refer to a user identity and associated security keys, and/or an ability to generate security keys or challenge responses based on a user identity or password. More generally, a credential can refer to any information that is used to enable a secured access to a network (e.g., such as a user identity and password to access a wireless access network). In some examples, user credentials can be provided over an encrypted communication channel.

Time that the asset tracking device 104 should perform the next reporting.

Expected location or location information corresponding to the expected location at a future reporting time instance of the asset tracking device 104.

As further shown in FIG. 2, the asset tracking device 104 performs (at 206) an initial access of the wireless access network using the assistance information. For example, to allow the asset tracking device 104 to send the next asset tracking report, the asset tracking device 104 can use the prioritized service provider/RAT/frequency band/carrier frequency information included in the assistance information to select a service (e.g., a PLMN), a RAT, a frequency band, and/or a carrier frequency to use to access a wireless access network.

In some examples, the asset tracking device 104 can behave as follows. The asset tracking device 104 can check to see if the previous service provider/RAT/frequency band/carrier frequency is available. If the previous service provider/RAT/frequency band/carrier frequency is available, the asset tracking device 104 may use the same profile as it used when the asset tracking device 104 sent the first information (at 202 in FIG. 1), and the asset tracking device 104 can select a suitable cell belonging to the same PLMN as was used when sending the last asset tracking report (the first information).

If the previous service provider/RAT/frequency band/carrier frequency is not available, or if the asset tracking device 104 is operated in a mode where it always searches according to the assistance information provided by the service 114 (regardless of the previous service provider/RAT/frequency band/carrier frequency used), then the asset tracking device 104 searches for a service provider/RAT/frequency band/carrier frequency in the priority order as indicated by the assistance information sent by the service 114. For a given RAT/frequency band/carrier frequency, the asset tracking device 104 performs a cell search and selects the first available cell that is of sufficient quality (e.g., RSSI exceeds a threshold) and that supports a service provider (e.g., PLMN) to which the asset tracking device 104 can gain access.

Where multiple service providers are supported, the asset tracking device 104 can select among the multiple service providers by taking into account any prioritized list of service providers provided by the service 114 in the assistance information (204), or by using the prioritized service provider list that is included in each profile on the asset tracking device 104. The ordering of profiles to be considered may be according to any prioritized profile identity list that is provided by the service 114 in the assistance information. The asset tracking device 104 can also take into account any service providers for which credentials were provided in the assistance information.

Alternatively, the prioritized profile identity list in the assistance information may not be provided to the asset tracking device 104, and the asset tracking device 104 may accelerate a cell search by selecting a cell belonging to any service provider for which the device has valid credentials, such as credentials provided by the network or in a universal subscriber identity module (USIM). For example, when the asset tracking device 104 has found a cell and detects a service provider, the asset tracking device 104 then determines if the service provider is associated with the set of credentials that the asset tracking device 104 has. This increases the chance of quickly finding a cell for the asset tracking device 104 that supports multiple service providers.

After the asset tracking device 104 has performed the initial access based on the assistance information and the asset tracking device 104 has established a connection with the wireless access network, the asset tracking device 104 can send second information (at 208) to the service 114, where the second information can be the next asset tracking report sent by the asset tracking device 104.

Figure 3:
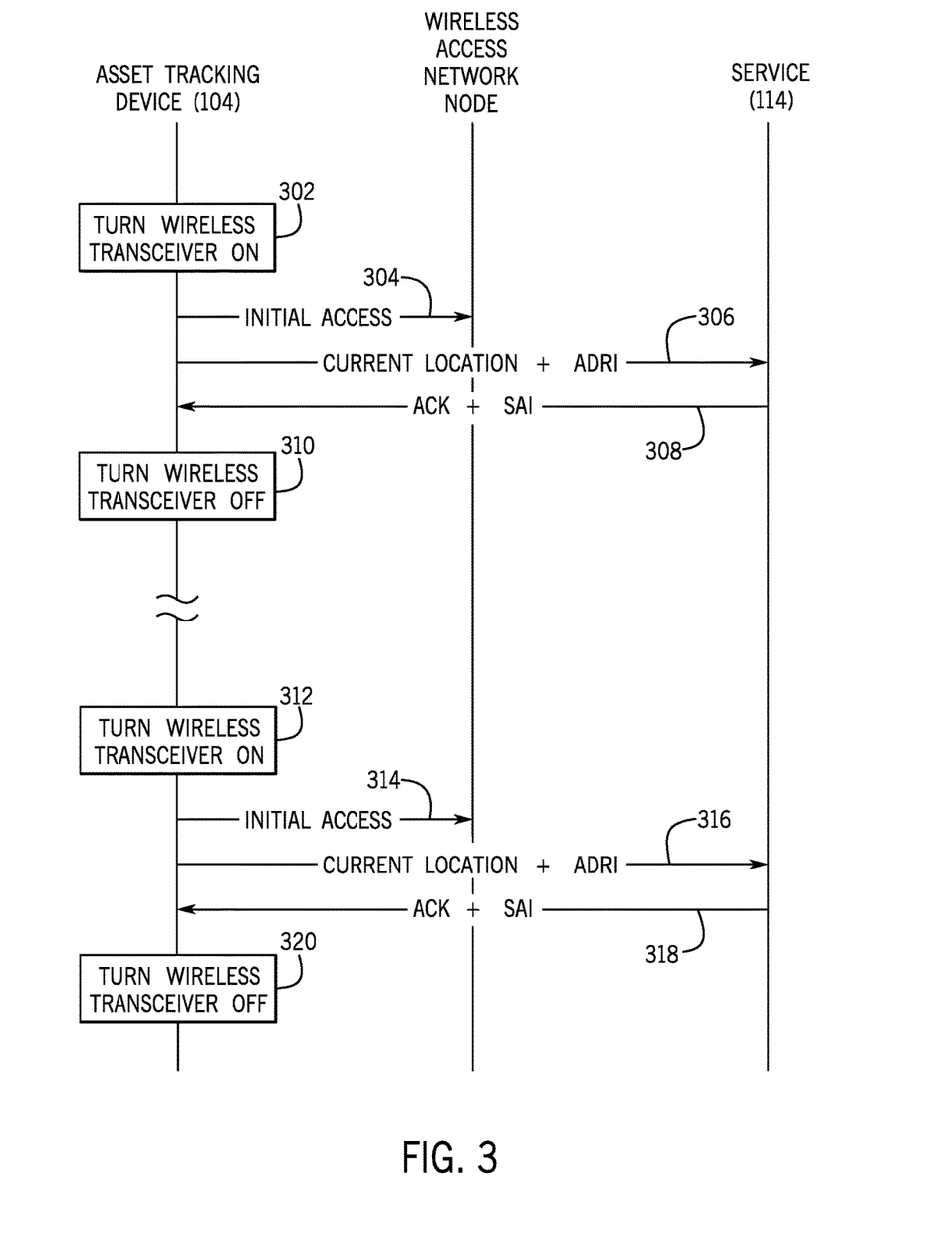
FIG. 3 is a message flow diagram depicting operations involving an asset tracking device, a wireless access network, and an asset tracking service, according to further implementations.

FIG. 3 is a message flow diagram of operations involving the asset tracking device 104, a wireless access network, and the service 114, according to further examples. At a scheduled time when the asset tracking device 104 (which can be a mobile device, for example) is to send an asset tracking report (or a mobile report), the asset tracking device 104 turns on (at 302) its wireless transceiver, and performs (at 304) an initial access of the wireless access network using previously received assistance information. Once the asset tracking device 104 has established a connection with the wireless access network, the asset tracking device 104 sends (at 306) an asset tracking report that includes a current location (of the asset tracking device 104) and an ADRI (as explained above). In response to the asset tracking report, the service 114 sends (at 308) an acknowledgment (ACK) message that can include an SAI (explained above). Although reference is made to the ADRI as being part of the asset tracking report, it is noted that in other examples, the ADRI can be in a message separate from the asset tracking report. Similarly, although reference is made to the SAI as being included in the ACK message, it is noted that the SAI can be included in a message separate from the ACK message in other examples. The asset tracking device 104 then turns off (at 310) its wireless transceiver.

At the next time instance when the asset tracking device 104 is scheduled to send the next asset tracking report, the asset tracking device 104 turns on (at 312) its wireless transceiver, and performs (at 314) an initial access of the wireless access network using previously received assistance information (e.g., the SAI received at 308). Once the asset tracking device 104 has established a connection with the wireless access network, the asset tracking device 104 sends (at 316) an asset tracking report that includes a current location (of the asset tracking device 104) and an ADRI. In response to the asset tracking report, the service 114 sends (at 318) an acknowledgment (ACK) message that can include an SAI. The asset tracking device 104 then turns off (at 320) its wireless transceiver.

The main goal of solutions according to some implementations of the present disclosure is to reduce the power consumption by reducing the time involved in the asset tracking device 104 performing the tasks relating to the initial access (206 in FIG. 2) of a wireless access network. Generally, to achieve this, the asset tracking device 104 can use the assistance information from the service 114.

The current location information is obtained for example using GPS coordinates and is assumed to be available at the asset tracking device 104 prior to the wireless transceiver 108 being switched on (or at least in time before the asset tracking device 104 starts to perform the initial access of the wireless access network).

Building or Updating a Database of Information by the Service 114

Over time, based on the asset tracking reports provided by the asset tracking device 104 to the service 114, the service 114 can build or update a database of various parameters (e.g., parameters identifying service providers, RATs, frequency bands, carrier frequencies, system information, signal strengths, etc.) indexed according to location information. This database can then be used by the service 114 in generating the assistance information sent to asset tracking devices by the service 114.

In response to receiving the ADRI and the current location information of an asset tracking device (such as 104), the service 114 updates the database. The database including the ADRI can be indexed according to different locations. Further, the database can also be organized or indexed such that any information specific to a particular service provider/RAT/frequency band/carrier frequency at a given location may be retrieved when requested. Such information specific to a particular service provider/RAT/frequency band/carrier frequency can be referred to as "information relating to a wireless access network," where the wireless access network is associated with some combination of one or more of the service provider, RAT, frequency band, and carrier frequency.

In general, the database may be arranged in such a way that information relating to a wireless access network within the ADRI at a given location may be retrieved when requested. An example of a portion of such a database is shown in Table 2 below. In Table 2, locations (location 1 and location 2) are correlated to respective information relating to wireless access networks, including an identity of a wireless access network node, an RAT, a service provider, system information, signal strength information, and carrier frequency.

Note that the measured values such as the signal strengths may be averaged over a number of received asset tracking reports (from the same or different asset tracking device) for a given location.

mation pertaining to a given location or a given wireless access network node or a given frequency or a given RAT or a given PLMN, then the service 114 may send an indication to asset tracking devices to refrain from including further ADRI related to the given location or given wireless access network node or given frequency or given RAT or given PLMN.

Figure 4:
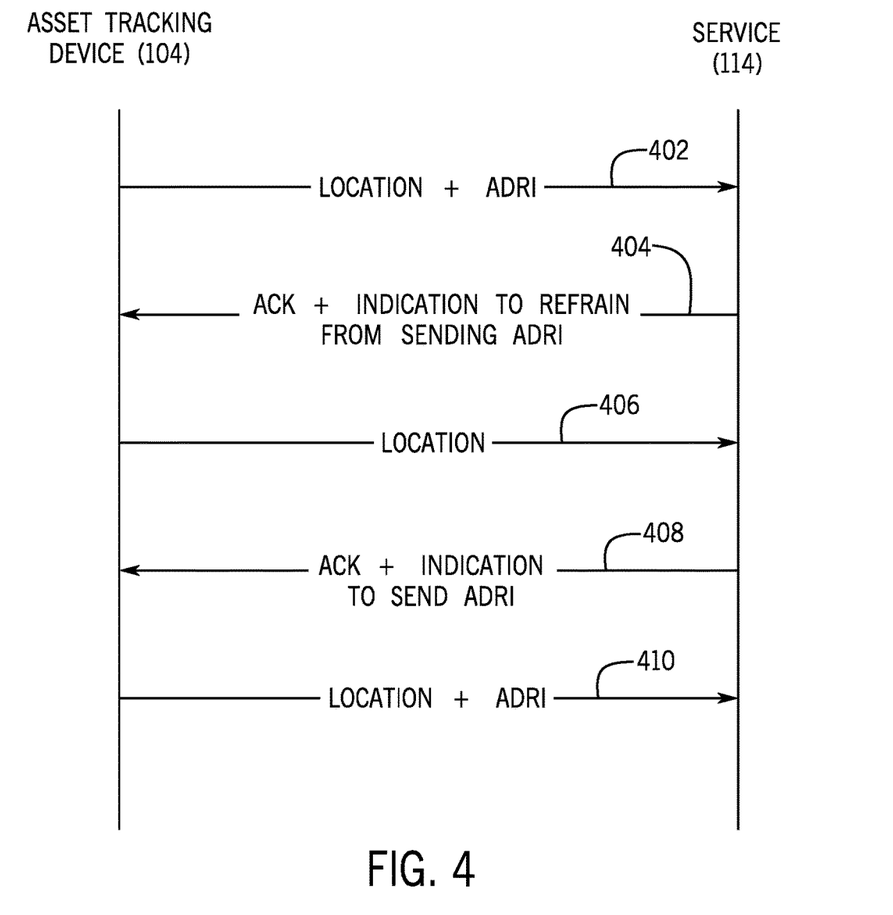
FIG. 4 is a message flow diagram depicting operations involving an asset tracking device and an asset tracking service, according to other implementations.

FIG. 4 shows an example message flow where indications are sent to refrain from sending or to send ADRI. The asset tracking device 104 sends (at 402) an asset tracking report that includes its current location information and an ADRI. In response, the service 114 responds by sending (at 404) an ACK message that includes or is otherwise associated with a first indication to refrain from sending all or part of the ADRI. The first indication can also be an indication regarding selected ADRI to not send.

In response to the first indication, when the asset tracking device 104 sends (at 406) its next asset tracking report, the asset tracking device 104 includes only its current location information, or the current location information plus a partial ADRI.

In response to the next asset tracking report, the service 114 sends (at 408) an ACK message that includes or is otherwise associated with a second indication to send all or part of the ADRI. In response to the second indication, the asset tracking device 104 sends (at 410) its current location information, plus the full ADRI or a part of the ADRI. Note that the sending (at 410) can be performed immediately in response to the second indication (prior to detaching from the wireless access network), or can be delayed until the next scheduled asset tracking report. In some examples, the service 114 can provide an indication whether the current location plus full ADRI is to be immediately sent or is sent with the next asset tracking report.

TABLE 2

| Location | Access network node | RAT | Service Provider | System Information | Signal Strength | Carrier Frequency |
|---|---|---|---|---|---|---|
| Location 1 | BS1 | GSM | Company A | SI1, SI2, SI3 | RSSI −92 dBm | 800 MHz |
|  | BS1 | GSM | Company A | SI1, SI2, SI3 | RSSI −92 dBm | 1800 MHz |
|  | BS1 | UMTS | Company B | MIB and SIB1, SIB2 | RSSI −93 dBm | 900 MHz |
|  | BS1 | LTE | Company C | MIB and SIB1, SIB2 | RSRP −95 dBm, RSSI −98 dBm | 920 MHz |
| Location 2 | BS1 | GSM | Company A | SI1, SI2, SI3 | RSSI −92 dBm | 1800 MHz |
|  | BS1 | GSM | Company B | SI1, SI2, SI3 | RSSI −62 dBm | 1900 MHz |
|  | BS1 | UMTS | Company B | MIB and SIB1, SIB2 | RSSI −93 dBm | 780 MHz |
|  | WLAN AP1 | WLAN | Company D | SSID, BSSID, etc. | Beacon RSSI = −78 dBm | 2.437 GHz (channel 6) |

In some examples, once the database is populated (to a specified level of detail), further asset tracking reports from the asset tracking device 104 may no longer have to be provided (for a given location). As such, the service 114 may indicate to asset tracking devices whether or not to send further asset tracking reports. In response to such an indication, asset tracking devices can avoid reporting redundant information, which may in turn reduce the overall power consumption and also reduce the amount of data sent over the air. Such an indication may include a flag (or a message) that is sent with the assistance information (e.g., 204 in FIG. 2 or 308 or 318 in FIG. 3). As a further option, such a flag or message may distinguish which selected information may be included or skipped by an asset tracking device. As an example, if the database contains a specified level of infor- In some examples, the service 114 can implement any of various different techniques by which the service 114 determines whether an asset tracking device should provide an ADRI. Various example techniques (1-3) are listed below. Note that other techniques can be used in further examples.

1) If the service 114 has already been provided with information for every possible service provider, RAT, frequency band, and carrier frequency, in a given location, then the service 114 can determine that asset tracking devices do not have to provide further ADRI for the given location.
2) The service 114 can take into account the staleness of existing ADRI in the database maintained by the service 114. If the service 114 determines that the service 114 has information but that this information was provided more than some specified amount of time ago (such that the information may be stale), then the service 114 may request that asset tracking devices provide updated ADRI. If the information in the database is up-to-date, then selected ADRI can be skipped. Alternatively, if the service 114 has collected recent (not stale) information from N (N≥1) or more devices at a certain location or on a certain route, then the service 114 can cease asking devices to provide more ADRI at such locations or on such routes.

3) The service 114 can select one or more asset tracking devices as corresponding one or more "test drive" asset tracking devices. An asset tracking device can be selected, for example, based on information regarding the amount of battery charge left in the asset tracking device, or information regarding whether the asset tracking device is connected to a power supply or will shortly be recharged. An asset tracking device that has a relatively high battery charge or that is connected to a power supply or that will shortly be charged can be selected as a test drive asset tracking device to send updated ADRI to the service 114. The non-selected asset tracking devices will not send updated ADRI to the service 114. In some examples, wireless devices (e.g., smart phones, mobile computers, vehicles, etc.) may be selected for sending information that can be used to populate the database maintained by the service 114. Selected devices may provide reports for the entirety of their route and may be selected according to the route that the service 114 knows that the device will be taking (e.g., information from asset tracking devices mounted on moveable platforms that will likely travel along specific routes for which information may not be available may be more desirable). In some examples, the test drive asset tracking devices can be configured to regularly do full RAT/frequency band/carrier frequency scans (and not just stop scanning when a suitable cell or PLMN is found). Additionally, in some examples, the selected devices can be configured to report difference information (i.e., information that is different from previously reported information).

As an alternative to the ADRI being provided with each asset tracking report, an asset tracking device may collect the ADRI over a time period (covering multiple asset tracking report periods), and the asset tracking device can then upload the collected ADRI at one time in a larger file upload. In such examples, the asset tracking device may upload the collected ADRI using a different, and possibly more efficient, data transfer mechanism. For example, the asset tracking device can upload the collected ADRI in response to detecting that a more efficient RAT such as LTE is available. As another example, the asset tracking device can use an efficient transport mechanism for large volumes of data, such as the user plane transfer in LTE as opposed to Rel-13 data transfer using uplink non-access stratum (NAS) signaling messages.

In further examples, ADRI can be sent by an asset tracking device to the service 114 using AT commands or equivalent interfaces. An AT command refers to a command used to control a wireless transceiver.

Constructing an SAI by the Service 114

In response to an asset tracking device reporting its current location (possibly along with an ADRI), the service 114 may construct the assistance information (e.g., SAI) as follows.

The service 114 estimates the next location of the asset tracking device at the next scheduled time instance when the asset tracking device is to send the next asset tracking report. If, as an example, this next location coincides with location 2 in the example database of Table 2 above, the service 114 can look for the available wireless access networks in location 2. According to Table 2, it can be seen that Company A, Company B, and Company C are the only service providers available in location 2, so the prioritized service providers for this location will be restricted to these service providers. The service 114 will also look for operating carrier frequencies for networks operated by these service providers in location 2. The service 114 may then retrieve the user credentials that are to be used to access the respective networks. In this case, it is assumed that the credentials to access either the network of Company A or the network of Company B reside locally on the asset tracking device (e.g., within a USIM in the asset tracking device). In contrast, the latest credentials to access the network of Company C may have to be separately provided to the asset tracking device. Based on the foregoing example scenario, the service 114 can then compile a message containing an SAI as set forth in Table 3 below.

TABLE 3

| Expected Location (for next report) | Preferred wireless access network node | RAT | Service Provider | System Information | Expected Signal Strength (optional) | Carrier Frequency | User Credentials |
|---|---|---|---|---|---|---|---|
| Location 2 | BS1 | GSM | Company B | SI1, SI2, SI3 | RSSI −62 dBm | 1900 MHz | USIM1 |
|  | BS1 | UMTS | Company B | MIB and SIB1, SIB2 | RSSI −93 dBm | 780 MHz | USIM1 |
|  | WLAN AP1 | WLAN | Company C | SSID, BSSID, etc | Beacon RSSI = −78 dBm | 2.437 GHz (channel 6) | PSK: "XYZ" |
|  | BS1 | GSM | Company A | SI1, SI2, SI3 | RSSI −92 dBm | 1800 MHz | USIM2 |

In further examples, the service 114 may include multiple SAI records indexed by location. For example, a set of RATs/frequency bands/carrier frequencies may be provided for an area (sector) 15 minutes north of the current location, another set may be provided for an area (sector) 15 minutes east of the current location, another set may be provided for an area (sector) 15 minutes west of the current location, and another set may be provided for an area (sector) 15 minutes south of the current location.

Alternatively, more detailed location tagging may be provided. Then depending on which actual location/sector the asset tracking device finds itself within when the asset tracking device is to send an asset tracking report, the asset tracking device can retrieve the relevant location tagged SAI (e.g., in the form of a file, a table, or other data structure) in order to determine the parameters for performing initial access of a wireless access network.

The service 114 may also provide information about a region (where there is no wireless coverage) that the asset tracking device may reach by the time of the next asset tracking report is to be sent. The asset tracking device can take this into account and avoid performing an initial access in this region.

In further examples, the SAI can be sent from a processor of a system that hosts the service 114 to a modem of the system using AT commands or equivalent interfaces.

Leveraging Assistance Information to Reduce Power Consumption During Initial Access As noted above, the asset tracking device leverages its current location information along with the assistance information (e.g., SAI) to reduce power consumption during the initial access procedure. Each piece of information provided in the SAI (optionally along with the location information of the asset tracking device) may be used to reduce power consumption and accelerate one or more specific tasks within the initial access procedure, thereby reducing overall power consumption. A few examples are given below on how the asset tracking device can leverage different pieces of information provided in the SAI. It should be noted that at any time if the asset tracking device does not find a suitable cell using the accelerated initial access procedure, the asset tracking device can fall back to the normal full initial access procedure discussed further above.

Leveraging Radio Information

If the asset tracking device knows the service provider/RAT/frequency band/carrier frequency of each network at the location where an asset tracking report is to be triggered, the asset tracking device may prioritize these in the initial cell search algorithm. For example, the asset tracking device can perform the RSSI scan on the known frequencies to expedite the RSSI scanning procedure. Further, the asset tracking device may also only operate the wireless transceiver for the specific RAT mode that is available as indicated in the SAI. For example, if the SAI indicates the presence of only a specific RAT (e.g., GSM), then the asset tracking device can operate its wireless transceiver in GSM only mode to avoid looking for cells of other RATs (which would an incur additional power penalty).

If expected frequencies are identified as having high RSSI (above a specified threshold), then the asset tracking device proceeds further to detect the cells at such expected frequencies, and the asset tracking device can synchronize with such cells, such as by detecting synchronization information (e.g., PSS, SSS, etc.), and receiving system information (e.g., in the MIB and SIB1).

On the other hand, if the expected frequencies are associated with RSSIs below the specified threshold, then it is likely that the radio environment of the asset tracking device has changed or the asset tracking device is not at the expected location. In response to detecting this condition, the asset tracking device may fall back to the normal (non-accelerated) initial access procedure as discussed further above.

Leveraging System Information

Having detected the cells and identified suitable cells which the asset tracking device can access, the asset tracking device may check if the system information for each corresponding suitable cell is available in the SAI. If such system information is available, the asset tracking device may further check if the system information broadcast in each suitable cell has changed from the information provided in the SAI. For example, in case of LTE, this checking can be performed by the asset tracking device checking the System Information Value Tag in SIB1. If the Value Tag in SIB1 matches the Value Tag of the corresponding system information in SIB1 provided in the SAI, the asset tracking device can skip obtaining system information for all other SIBs and directly proceed to performing random access.

Leveraging User Credentials

The SAI can include a prioritized list of profile identities that the asset tracking device should use, and/or new user credentials that may be relevant to the location at which the next asset tracking report is triggered. As an example, the SAI may include a profile identity to be used for a specific PLMN available at the location (the asset tracking device is assumed to have access to the corresponding (u)SIM/ISIM credentials), or the SAI may include user credentials such as a pre-shared key (PSK) corresponding to a local WLAN available at the asset tracking device's location or other credentials which will allow the asset tracking device to access any local wireless network.

The asset tracking device may initialize the scan to look for any cell belonging to service providers corresponding to the prioritized list of profile identities. When one of such cells for which the asset tracking device has valid credentials is found, the asset tracking device can proceed to attach to the cell. In a dense wireless network environment where multiple cells belonging to multiple service providers are seen by the asset tracking device, this procedure can improve the chances that the asset tracking device gets attached faster to a wireless access network since the chances of the asset tracking device finding at least one suitable cell belonging to any of the valid service providers will be higher than the asset tracking device looking for a cell belonging to a specific (single) service provider. By enabling the asset tracking device to leverage multiple simultaneous user credentials (valid on multiple service providers), the probability of finding a suitable cell in a shorter amount of time is improved.

System Architecture

Figure 5:
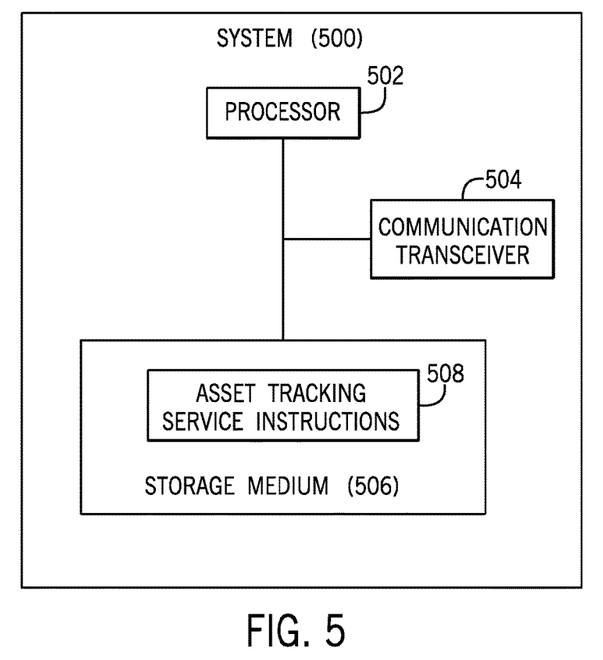
FIG. 5 is a block diagram of an example system according to some implementations.

FIG. 5 shows an example of a system 500, which can be implemented with a computer or multiple computers. The system 500 can be used to implement the service 114 discussed above. The system 500 includes a processor (or multiple processors) 502. In addition, the system 500 includes a communication transceiver 504 to communicate over a network, and a non-transitory machine-readable or computer-readable storage medium 506 that stores machine-readable instructions 508, such as asset tracking service instructions of the service 114, for execution on the processor(s) 502 to perform the tasks of the service 114 discussed herein.

The storage medium 506 can any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Note also that although a storage medium is not shown in FIG. 1 for the asset tracking device 104, it is noted that such a storage medium storing machine-readable instructions can be included in the asset tacking device 104.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A device comprising:
    a wireless transceiver;
    at least one processor; and
    a non-transitory storage medium storing instructions executable on the at least one processor to:
        send, using the wireless transceiver, first information to a service, the first information comprising location information of the device and a speed of the device;
        receive, from the service through the wireless transceiver, assistance information that is based on the first information comprising the location information and the speed of the device;
        perform initial access of a selected wireless access network using the assistance information, and as part of performing the initial access:
            determine whether one or more of a radio access technology, a frequency band, and a carrier frequency previously used by the device is available;
            in response to determining that the one or more of the radio access technology, the frequency band, and the carrier frequency previously used by the device is available, access a first wireless access network based on the one or more of the radio access technology, the frequency band, and the carrier frequency previously used by the device, and
            in response to determining that the one or more of the radio access technology, the frequency band, and the carrier frequency previously used by the device is not available, perform initial access of a second wireless access network using the assistance information to achieve power saving at the device; and
        transmit, using the wireless transceiver over the selected wireless access network, second information to the service.

2. The device of claim 1, wherein the second information comprises information relating to a transport of cargo carried by a moveable platform.

3. The device of claim 2, wherein the assistance information is based on a predicted location of the device at a time of next reporting of the second information by the device, the predicted location based on the location information and the speed of the device.

4. The device of claim 1, wherein the assistance information comprises any or some combination of:
    information relating to one or more of a radio access technology, a frequency band, and a carrier frequency to use,
    time of next reporting of second information, and
    expected location of the device at the next reporting of second information.

5. The device of claim 1, wherein the assistance information is based on one or more of:
    one or more profiles supported by the device, and
    one or more capabilities of the device.

6. The device of claim 1, wherein performing the initial access of the second wireless access network using the assistance information comprises one or more of:
    using the assistance information to perform a received signal strength indicator (RSSI) scan to identify a presence of the second wireless access network, and
    using a wireless access credential in the assistance information to gain access to the second wireless access network.

7. The device of claim 1, wherein performing the initial access of the second wireless access network using the assistance information comprises:
    using the assistance information to prioritize a search of a cell in the second wireless access network as part of the initial access.

8. The device of claim 7, wherein the instructions are executable on the at least one processor to further:
    as part of using the assistance information to prioritize the search of the cell in the second wireless access network, use information relating to a service provider in the assistance information to find a cell that belongs to the service provider.

9. The device of claim 7, wherein the instructions are executable on the at least one processor to further:
    as part of using the assistance information to prioritize the search of the cell in the second wireless access network, use credential information of a user credential and service provider information relating to a service provider in the assistance information to find a cell that belongs to the service provider for which the device has a valid user credential.

10. The device of claim 1, wherein performing the initial access of the second wireless access network using the assistance information comprises:
    determining whether the assistance information includes system information of the second wireless access network; and
    in response to determining that the assistance information includes system information of the second wireless access network, use the system information in the assistance information to perform the initial access without obtaining a given portion of the system information from the second wireless access network.

11. The device of claim 10, wherein the instructions are executable on the at least one processor to further:
    compare a value tag of a first portion of the system information in the assistance information with a value tag of a first portion of the system information from the second wireless access network,
    wherein the using of the system information in the assistance information to perform the initial access without obtaining the given portion of the system information from the second wireless access network is in response to the value tags matching.

12. The device of claim 1, wherein the first information further comprises any or some combination of:
    information relating to one or more of a currently used service provider, radio access technology, a frequency band, and a carrier frequency,
    information of a profile used by the device,
    information of one or more capabilities of the device, information of a route of the device,
information of signal strengths of neighbor wireless access network nodes,
information relating to locations of wireless access network nodes, and
system information of wireless access network nodes in a communication range of the device.

13. A system comprising:
at least one processor; and
a non-transitory storage medium storing instructions executable on the at least one processor to:
receive first information transmitted wirelessly by a device, the first information comprising location information of the device, a speed of the device, and information relating to a wireless access network;
update a database using the received first information, the database comprising a plurality of entries, each respective entry of the plurality of entries correlating a location of the device to information relating to one or more wireless access networks; and
send, to the device, assistance information that is based on the first information and on a predicted location of the device at a time that the device is to send cargo information of cargo transported by a moveable platform that includes the device, the predicted location based on the location information and the speed of the device, the assistance information comprising information from the database and the assistance information to cause the device to perform initial access of a wireless access network using the assistance information, the accessed wireless access network for use in sending the cargo information by the device.

14. The system of claim 13, wherein the instructions are executable on the at least one processor to further:
determine whether the device is to report selected first information;
in response to determining that the device is not to report the selected first information, send an indication to the device to not send the selected first information; and
after sending the indication to the device to not send the selected first information, send another indication to the device to resume sending the selected first information.

15. The system of claim 14, wherein the instructions are executable on the at least one processor to:
determine whether the device is to report the selected first information by determining whether the database has been populated to a specified level,
wherein the sending of the indication to the device to not send the selected first information is in response to determining that the database has been populated to the specified level.

16. The system of claim 14, wherein the instructions are executable on the at least one processor to determine whether the device is to report the selected first information based on any or some combination of:
determining that information relating to a possible service provider, radio access technology, frequency band, and carrier frequency has been populated in the database for a given location,
determining that information in the database is up-to-date,
determining whether the device is a designated device that is designated to report device information, and
selecting the device based on a route to be taken by the device.

17. The system of claim 13, wherein the instructions are executable on the at least one processor to further:
compute the predicted location based on the location information and the speed of the device.

18. The system of claim 13, wherein the instructions are executable on the at least one processor to further:
configure the device to report just a difference between information already available in the database and information obtained by the device.

19. The system of claim 13, wherein the instructions are executable on the at least one processor to further:
configure a selected device to perform a full scan of cells across radio access technologies, frequency bands, carrier frequencies, and service providers, and to report device information based on the full scan.

20. A non-transitory machine-readable storage medium storing instructions that upon execution cause a wireless device to:
send first information to a service, the first information comprising location information of the wireless device;
receive, from the service, assistance information that is based on the first information;
determine whether one or more of a radio access technology, a frequency band, and a carrier frequency previously used by the wireless device is available;
select a wireless access network comprising:
in response to determining that the one or more of the radio access technology, the frequency band, and the carrier frequency previously used by the wireless device is available, access a first wireless access network based on the one or more of the radio access technology, the frequency band, and the carrier frequency previously used by the wireless device, and
in response to determining that the one or more of the radio access technology, the frequency band, and the carrier frequency previously used by the wireless device is not available, perform initial access of a second wireless access network using the assistance information to achieve power saving at the wireless device; and
transmit second information to the service over the selected wireless access network.

21. The non-transitory machine-readable storage medium of claim 20, wherein the instructions upon execution cause the wireless device to:
perform the initial access of the second wireless access network by searching for the second wireless access network according to a priority order of one or more of radio access technologies, frequency bands, and carrier frequencies indicated by the assistance information.

22. The non-transitory machine-readable storage medium of claim 20, wherein the first information further comprises a speed of the wireless device, and the assistance information is based on a predicted location of the wireless device computed by the service based on the location information and the speed of the wireless device.

* * * * *